United States Patent
Candelore et al.

(10) Patent No.: US 12,436,731 B2
(45) Date of Patent: Oct. 7, 2025

(54) NOISE DETECTION FOR SKIP BACK OF AUDIO

(71) Applicant: Sony Group Corporation, Tokyo (JP)

(72) Inventors: Brant Candelore, Poway, CA (US); Mahyar Nejat, La Jolla, CA (US)

(73) Assignee: SONY GROUP CORPORATION, Tokyo (JP)

( * ) Notice: Subject to any disclaimer, the term of this patent is extended or adjusted under 35 U.S.C. 154(b) by 255 days.

(21) Appl. No.: 18/209,382

(22) Filed: Jun. 13, 2023

(65) Prior Publication Data
US 2024/0419390 A1    Dec. 19, 2024

(51) Int. Cl.
*G10L 25/78* (2013.01)
*G06F 3/16* (2006.01)

(52) U.S. Cl.
CPC .............. *G06F 3/165* (2013.01); *G10L 25/78* (2013.01)

(58) Field of Classification Search
CPC ....... G06F 3/165; G06F 3/167; G06V 40/174; G10K 11/17823; G10K 11/178; G10K 11/17885; G10L 21/0208; G10L 25/51; G10L 25/78; G10L 25/84; G10L 25/87; G10L 15/22; G10L 21/0232; G10L 21/0364; G10L 25/18; G11B 27/036; H04N 21/47217; H04N 21/4436; H04R 1/028; H04R 1/1041; H04R 29/001; H03G 3/32; H03G 5/165; H04S 3/008; H04S 7/302
See application file for complete search history.

(56) References Cited

U.S. PATENT DOCUMENTS

| | | | |
|---|---|---|---|
| 9,398,367 B1 | 7/2016 | Scott | |
| 9,723,381 B2 | 8/2017 | Swanson | |
| 10,013,999 B1* | 7/2018 | Fadell | H04R 1/028 |
| 11,606,606 B1* | 3/2023 | Doken | H04N 21/47217 |
| 11,822,367 B2* | 11/2023 | Eubank | G10K 11/17885 |
| 2008/0089530 A1 | 4/2008 | Bostick | |
| 2010/0104113 A1* | 4/2010 | Liu | G10L 21/0208 |
| | | | 381/94.2 |
| 2010/0260354 A1* | 10/2010 | Ozawa | G10L 21/0208 |
| | | | 381/94.4 |

(Continued)

FOREIGN PATENT DOCUMENTS

| | | |
|---|---|---|
| JP | 2012058355 A | 3/2012 |
| JP | 2014123887 A | 7/2014 |
| WO | WO2023277948 | 1/2023 |

*Primary Examiner* — Gerald Gauthier
(74) *Attorney, Agent, or Firm* — Trellis IP Law Group, PC

(57) ABSTRACT

A noise detecting playback system is provided to facilitate adaptive output of audio content by an audio player in response to detecting noise interferences such as external noise outside of the playback. The detection playback system assesses microphone signals and sensor data of the playback system for signs of attention requiring features to trigger playback of the audio content. Microphone signals may provide volume level of a particular external noise, which is contrasted with output volume of the audio content, other noises in the environment, and/or a lack of detected noise in the environment to determine that the particular external noise is interfering or potentially interfering with the audio content. Image sensor data of the surroundings of the listener acquired by a camera coupled to a personal listening device may also be assessed for attention features associated with an external noise.

19 Claims, 6 Drawing Sheets

(56) References Cited

U.S. PATENT DOCUMENTS

| | | | |
|---|---|---|---|
| 2013/0003981 A1* | 1/2013 | Lane | H04R 29/001 |
| | | | 381/58 |
| 2014/0092212 A1 | 4/2014 | Ito | |
| 2017/0040029 A1* | 2/2017 | Ebenezer | G10L 25/18 |
| 2017/0242653 A1* | 8/2017 | Lang | G06F 3/167 |
| 2018/0091913 A1* | 3/2018 | Hartung | G10L 15/22 |
| 2018/0152796 A1* | 5/2018 | Stone | H04R 29/001 |
| 2018/0308467 A1* | 10/2018 | Yamkovoy | G10K 11/178 |
| 2018/0367932 A1* | 12/2018 | Audfray | H04S 7/302 |
| 2018/0374470 A1 | 12/2018 | Sarkar | |
| 2019/0069069 A1* | 2/2019 | Radin | H03G 3/32 |
| 2019/0069074 A1* | 2/2019 | Yamkovoy | G10K 11/17823 |
| 2019/0355341 A1* | 11/2019 | Steele | G10K 11/17823 |
| 2020/0286500 A1* | 9/2020 | Mukund | G10L 21/0232 |
| 2020/0351550 A1 | 11/2020 | Korupolu | |
| 2021/0266655 A1* | 8/2021 | Patel | H04R 1/1041 |
| 2021/0389925 A1* | 12/2021 | Adams | G10L 21/0364 |
| 2021/0397407 A1* | 12/2021 | Eubank | G06V 40/174 |
| 2022/0400344 A1* | 12/2022 | Woo | H04S 3/008 |
| 2022/0417659 A1* | 12/2022 | Narayanan | G11B 27/036 |
| 2023/0097522 A1* | 3/2023 | Mehrabi | G10L 25/51 |
| | | | 381/56 |
| 2023/0186938 A1* | 6/2023 | Cho | G10L 21/0208 |
| | | | 704/200 |
| 2023/0195783 A1* | 6/2023 | Millington | H03G 5/165 |
| | | | 704/270 |
| 2023/0259326 A1* | 8/2023 | D'Amato | H04N 21/4436 |
| 2024/0419389 A1* | 12/2024 | Candelore | G10L 25/87 |
| 2024/0419390 A1* | 12/2024 | Candelore | H04R 1/1041 |
| 2024/0420727 A1* | 12/2024 | Candelore | G10L 25/51 |

\* cited by examiner

NOISE DETECTION FOR SKIP BACK OF AUDIO

CROSS REFERENCES TO RELATED APPLICATIONS

This application is related to the following applications which are hereby incorporated by reference as if set forth in full in this application for all purposes: U.S. patent application Ser. No. 18/209,365, entitled AUDIO SKIP BACK RESPONSE TO NOISE INTERFERENCE (020699-123300US), filed on Jun. 13, 2023;

and

U.S. patent application Ser. No. 18/209,376, entitled RESPONSIVE NOISE CANCELATION OVERRIDE (020699-123400US), filed on Jun. 13, 2023.

BACKGROUND

Audio players include a variety of devices to provide audio content, including spoken word audio. With the advent of portable audio players, listeners are free to multitask by consuming audio content, while performing other activities, such as walking, exercising, driving, riding, and the like. Some audio players communicate with personal listening devices, for example, headphones, earbuds, and hearing aids that direct audio to the ear of a listener.

At times, noises from the environment may compete with outputted audio content, making it difficult for a listener to hear or understand the audio content. Certain external noises may require attention from the listener while other external noises may be ignored by the listener. The listener may be interrupted and then want to continue listening to the audio content. Noises that compete with the audio content being played may result in the listener missing or mishearing the outputted audio content. It can be desirable to playback parts of the audio that are interrupted by such noises.

SUMMARY

The present noise detection playback system (also called "playback system" or "detection system") enables adaptive output of audio content in response to certain identified noise interferences outside of the playback system. The detection playback system can assess microphone signals (which can include sound waves) and sensor data for signs of that the listener attention is required to trigger playback of the audio content. For instance, microphone signals may enable detection of volume level of a particular external noise, which can be contrasted with output volume of the audio content, other noises in the environment, and/or a lack of detected noise in the environment. Loudness level comparisons may be used to determine that the particular external noise is interfering or potentially interfering with the audio content. Image sensor data of the surroundings of the listener acquired by a camera coupled to a personal listening device may also be assessed for attention features associated with an external noise.

A computer-implemented method is provided for noise identification to trigger playback of audio content as performed by the present detection playback system. The method includes providing audio content to a personal listening device for output to a listener during a listening session. Microphone signals and/or sensor data from at least one aspect of an environment of the listener are received to detect one or more external noises. At least one attention feature can be determined by the microphone signals and/or the sensor data. A particular external noise of the one or more external noises is identified as including an interfering noise that disrupts the audio content being outputted at an interfered portion. The identification of the interfering noise is, based, at least in part, on determining the at least one attention feature. A skip back point may be determined in the provided audio content. A playback portion of the audio content is provided for output from the skip back point by the personal listening device during the listening session. The playback portion of the content includes the interfered portion of the audio content.

In some implementations the attention feature includes a loudness level. A particular interfering external noise can be identified using various parameters. For example, upon receiving the microphone signals for the external noise, a loudness level of the audio content as outputted may be detected. A loudness level of the particular external noise may also be determined based, at least in part, on the microphone signals. The loudness level of the provided audio content may be compared with the loudness level of the particular external noise. To identify the particular noise as interfering, a determination may be made that the loudness level of the particular external noise meets a threshold volume level above the loudness level of the provided audio content.

In some implementations that use loudness level as an attention feature to identify interfering external noises, in which the microphone signals represent multiple external noises, a loudness level for individual of the multiple external noises may be determined based, at least in part, on the microphone signals. A particular external noise of the multiple external noises may be found to have a loudness level that meets a threshold volume level above the respective loudness levels of the other external noises of the multiple external noises. Further to the method, recording data of the particular external noise may be inputted into a large language model (LLM) to perform natural language analysis. The LLM outputs a result that predicts the particular external noise includes a listener directed attention feature that requires the attention of the listener. In this manner the particular external noise is identified as interfering with the audio content.

In still some implementations that utilize loudness levels include monitoring the environment of the listener and detecting a void of noise in the environment for a predefine previous time immediately prior to detecting the particular external noise. The interfering noise may be identified by inputting microphone data of the particular external noise to an LLM to perform natural language analysis. A prediction is outputted by the LLM that the particular external noise includes a second attention feature that requires attention of the listener.

In some implementations, one or more images are captured as sensor data by one or more cameras coupled to the personal listening device. To identify the interfering noise further image recognition may be performed on the one or more images to identify an object and/or a gesture. Through image recognition, the object and/or the gesture may be found to indicate that the particular external noise includes the interfering noise that requires attention of the listener. Gestures can include a person other than the listener waving, pointing, jumping, or otherwise moving in a manner intended to gain attention of the listener.

At times, the gesture may include a person distant from the listener mouthing speech. In these cases, the speech of the person may be recognized by movement of lips, face and/or tongue of the person. The speech may be inputted to a speech artificial intelligence (AI) model. Output of the AI model may predict that the particular external noise includes the interfering noise requiring attention of the listener. The personal listening device may be any one of a headphone, an earbud, and a hearing aid.

In some aspects of certain implementations of the method, identifying the interfering noise further comprises identifying that the particular external noise is speech of a particular person in a location of the listener. It may be detected that the particular person speaks a threshold number of times greater than one within a predefined period of time, indicating the noise is an interfering noise.

The method of noise detection-based playback may also provide a voice notification of a playback mode to the personal listening device for output to the listener prior to outputting the playback portion.

In some implementations, an apparatus of a detection playback system is provided, which is configured for interfering noise identification to trigger playback of audio content. The apparatus includes one or more processors and logic encoded in one or more non-transitory media for execution by the one or more processors and when executed operable to perform various operations as described above in terms of the method.

In some implementations, a non-transitory computer-readable storage medium is provided which carries program instructions for interfering noise identification to trigger playback of audio content. These instructions when executed by one or more processors cause the one or more processors to perform operations as described above for the method.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

DETAILED DESCRIPTION OF EMBODIMENTS

Figure 1:
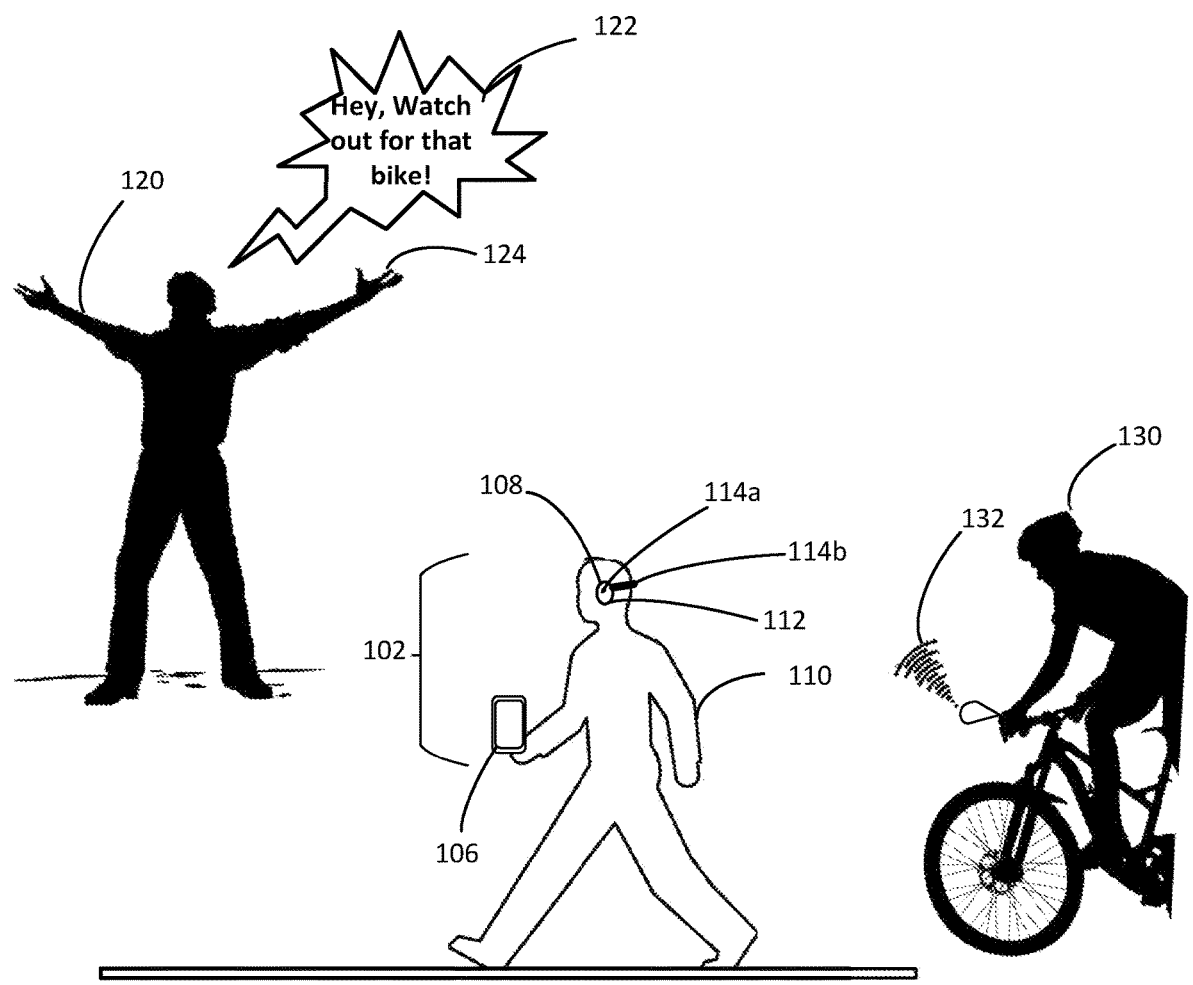
FIG. 1 is a conceptual diagram illustrating an example setting in which various aspects of a detection playback system can be implemented, in accordance with some implementations.

The present noise detection playback system enables a listener to consume audio content without concern that interfering noises from the environment hinders enjoyment of the content. The detection playback system identifies external noise in the environment of the listener that conflicts with the listening of the audio content and triggers playback of the audio content.

Environmental data from microphone(s) and/or sensor(s) are collected to assess various external noises for attention features of the noises and potential to interfere with the output of the audio content. In some instances, an attention feature may be associated with one or more characteristics of the listener. At times, interfering noises may be identified with use of microphone signals without any sensor data. At other times, both microphone signals and sensor data may be both considered in the identification. At still other times, only sensor data may be employed as a forewarning of an impending interfering noise.

An attention feature of the microphone signals may be associated with loudness volume of an external noise captured by a microphone coupled to the personal listening device and/or audio player. The volume of a particular external noise may be contrasted with output volume of the audio content, other noises in the environment, and/or a lack of detected noise in the environment to determine that the particular external noise is interfering and triggers audio playback.

In some circumstances, image sensor data of the surroundings of the listener may be captured by camera(s) coupled to a personal listening device. This sensor data may also be assessed for attention features associated with an external noise also in the environment. At times, the external noise may be identified by the image data prior to the microphone signals or heard by the listener. In some implementations, assessment of the image data may include lip reading by the detection playback system of speech of a person in the environment. In some implementations, an AI model may be employed to recognize speech in the environment of the listener that requires the listeners attention. The AI model may be trained on attention requiring speech that may be generally encountered or specifically encountered based on characteristics of the listener.

A "listener" (also referred to as a "user") as applied in this description, refers to one or more users that consume audio content outputted by the playback system. The listener may listen to the audio outputted via a personal listening device or directly from an audio player.

Personal listening devices (also referred to as "portable listening devices" or "directed listening devices") direct audio to the ears of the listener. Such devices can include headphones, earbuds, over-the-counter hearing aids, hearables, headsets, bone conduction wearables, sound beaming technology to focus audio through a space to ears of a listener, other advancements in personal listening devices including future technologies, and so on. Directed listening devices often pair with audio players, including audio playing software, that provide a source of the audio content. For example, some hearing aids can connect with a smartphone, tablet, or computer for the user to listen to audio content. However, some directed listening devices can also include an integrated audio source without communicating with a separate audio player. In general, personal listening devices can allow for screen-free playing of audio content.

Although personal listening devices are described, it should be understood that the detection playback system may also be applied to other listening devices, such as audio players coupled to or integrated with various electronic devices including multi-purposes electronic devices, such as a smartphone, computer, vehicle, home smart speakers, am/fm receiver, television audio channel, internet connected device, etc.

The skip back point for playback of the audio content is a place in the audio content after the beginning point from which the audio content was initially played during a listening session. In some implementations, the skip back point is a natural place in the audio content that, based on characteristic feature of the content, allow for a smooth transition for the listener. In some implementations, after the interfered portion of the audio content is replayed, the playback system seamlessly continues to output the audio content, such as prerecorded content, from the point that was left off of previously un-played portions of the audio content. Further details and examples of determining a skip back point that may be employed by the detection playback system, are described in U.S. patent application Ser. No. 18/209,365, entitled, AUDIO SKIP BACK RESPONSE TO NOISE INTERFERENCE, filed on Jun. 13, 2023, the contents of which is incorporated herein by reference.

In some circumstances, the audio content may include spoken word audio content. For the purposes of the present discussion, spoken word audio content (also referred to as "spoken word content" or "spoken word audio") may be any content in which speaking is the main or only focus of the content. Examples of spoken word audio includes podcasts, audiobooks, audio dramas, sermons, poetry, narration, storytelling, instructional recordings, and so on. Spoken word audio may be presented with or without music accompaniment but differs from music in that speech is a main focus in spoken word content. When spoken word is joined with music accompaniment, the spoken word content differs from lyrics of a song in that speech provides the main instrument and focus of the content, such as expressing text, telling a story, or a stream of consciousness. Content-based skip back points may not be as useful in music content because of repetition in the music and/or lyrics. However, aspects of the detection playback system may also be applied to music and other forms of audio content that can be outputted via a listening device.

The detection playback system is beneficial for a listener of audio content to avoid missing audio content when external noises interfere. The listener is free to switch attention from the audio content to environmental noises when necessary.

When an external noise interferes with the listener's enjoyment of the content, increasing the volume of the audio content above the external noise can be detrimental to the listener. It can also be burdensome for the listener to manually pause the audio content while exposed to an interfering noise and/or replay missed content. A listener may also manually attempt to find and replay a missed portion. But manual replaying of the content takes time and attention away from other tasks the listener may be involved with while listening to the audio content.

The present playback system addresses these problems with other systems and have additional benefits.

FIG. 1 is an illustration of an environment 100 in which a detection playback system 102 may be used to collect environmental signals and data and determine an interfering external noise that requires the listener's attention. The detection playback system 102 includes an audio player 104. In the example of FIG. 1, the audio player 104 may be a smart phone, which may be in communication with headphones 108 functioning as a personal listening device on a listener 110. A microphone 112 and sensors 114a, 114b coupled to the headphones 108 detect noise-related information from the environment. The headphones 108 includes multiple sensors including a side facing camera 114a over the ears and back facing camera 114b on a back strap of the headphones 108. The audio player determines that the noise is an interfering noise that is disruptive to the audio content being played. In some implementations, the microphone 112 may be coupled to the audio player 104 in addition to or instead of being coupled to the headphones 108.

The microphone 112 picks up on loud volume speech 122 calling out, "Hey, Watch out for that bike!" by a bystander 120. The side facing camera sensor 114a also captures images of the bystander 120 waving arms. The arm waving gesture 124 may be interpreted by an image recognition software of the playback system as an attention feature signifying an alert. The image recognition software further determines that the forward facing stance of the bystander 120 in the direction of the listener 110 may be an additional attention feature of the image that the waving arm gesture is intended for the listener 110. In some implementations, the coupling of the gesture and body stance of the sensor data with the microphone speech capture may result in identification of the bystander speech as an interfering noise of an urgent nature to trigger a pause and playback of audio content once it is urgency is detected as concluded. However, in some implementations, detection of the arm waving gesture may be determined as a forewarning of an interrupting noise to be captured by the microphone. In still some implementations, the bystander speech and gestures may be determined to forewarn additional noise and urgent events that require the attention of the listener. In such cases, the detection playback system may pause the audio content in anticipation of additional sequential events attention requiring.

In the illustrated example, a second event requiring listener attention is detected by back facing camera sensor 114b capturing images of a bicycle and rider 130 riding towards the listener 110. At a same time or proximal in time with the sensor data capture, the microphone 112 of the headphones 108 captures a sound 132 of a horn on the bicycle.

Both sensor data and microphone signals used to identify the bicycle horn as an interfering noise of an urgent nature, triggering pause of the audio content and playback once the urgent event is determined to be concluded. Upon determination of the interfering noise, the playback system 102 initiates a skip back mode. The playback system may be employed in a wide variety of other contexts and use cases.

Figure 2:
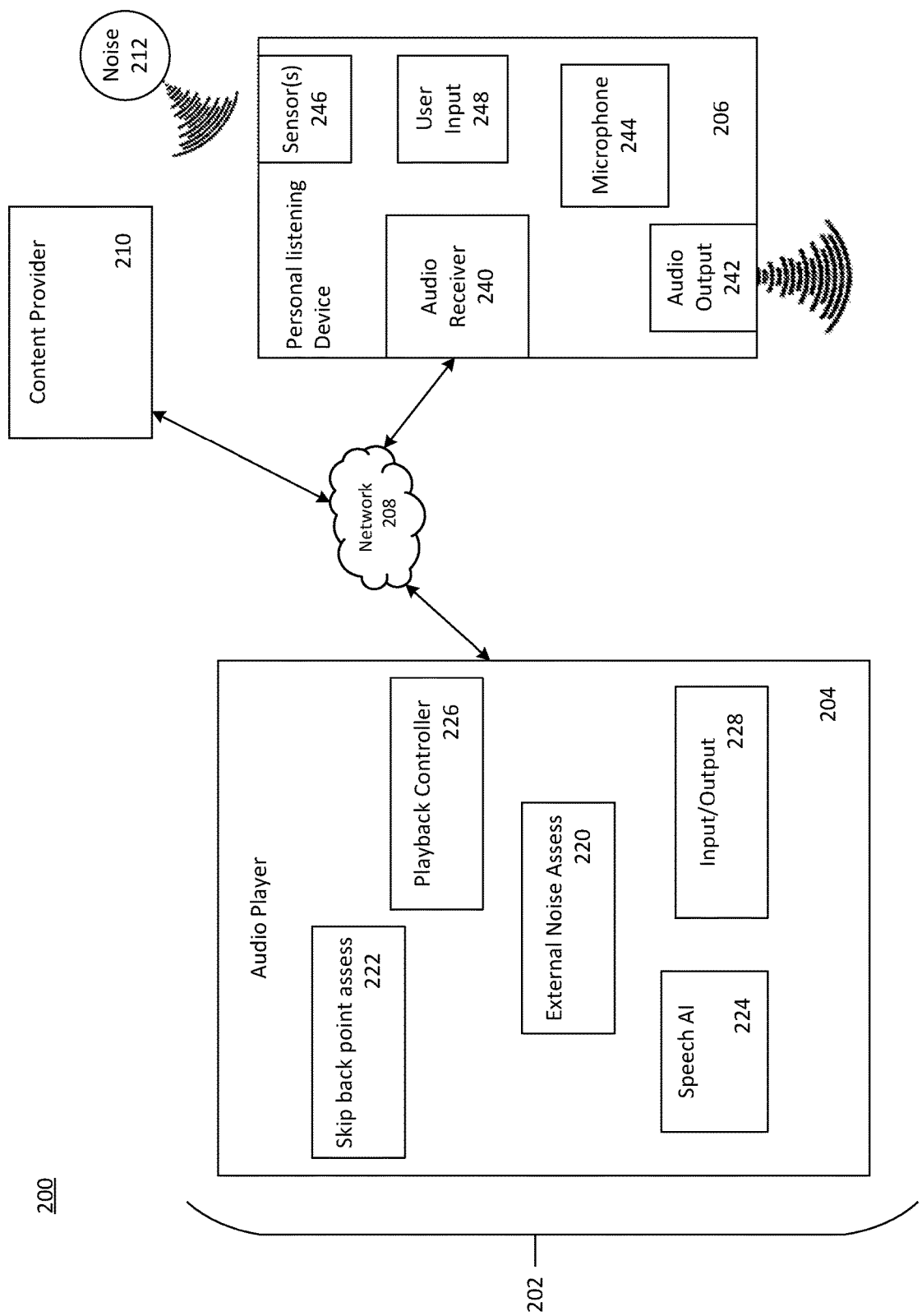
FIG. 2 is a block diagram of an example component environment that includes a detection playback system, in accordance with some implementations.

FIG. 2 is an example block diagram of an environment 200 containing the detection playback system 202 and other elements that enable operation of the detection playback system 202. The detection playback system 202 includes an audio player 204 that communicates with a personal listening device 206 across a network 208. Content provider 210 may provide prerecorded or live audio content to be received by the playback system 202.

The audio player 204 includes an external noise assessment module 220 to determine if a detected noise 212 or other interruption indicates an interfering noise to trigger the playback mode of the player 204. The noise assessment module 220 determines if the microphone signals and/or sensor data include attention features of the noise to indicate an interfering noise. The noise 212 may be produced by any source of object, person (e.g., talk, scream, etc.), animal, etc. The noise 212 may be a continuous sound or pulses produced as regular short intervals. Noise that is noncontinuous may be treated as an isolated stretch of a same noise for trigger of the playback when the pause between sounds is within a predefined short period of time, e.g. 1-10 seconds between bursts of a same type of noise. Such noncontinuous stretch of noise may trigger a single playback to a determined skip back point.

The playback system may pause the audio content output and wait during the pause period of time after a noise is not detected before playing back the audio. In a case of detection of an urgent event associated with the noise, the detection playback system may use microphone signals and sensor data to determine that the urgent event has concluded prior to the playback of audio content. An audio interruption may be detected by the microphone and/or sensor(s) of the audio player or the personal listening device 206, or other external devices coupled to the audio player 204 or independent of the audio player 204.

In some implementations, the external noise assessment module 220 may assess sensor data including visual data in addition to or instead of audio data to determine if an interrupting external noise is imminent or present. Where an attention feature includes noise loudness level, determining whether a noise is interrupting may include measuring a volume of the noise against a threshold volume that triggers the playback mode, as described herein. In some cases, the volume of the external noise may be compared to the listening volume of the outputted audio content. If the external noise volume is greater than the listening volume by a threshold amount, the playback mode may be triggered. At times, a loudness level threshold amount may be defined based, at least in part, on other attention features, a characteristic of the listener, such as hearing ability, environmental characteristics, such as the location of the listener, etc.

In some implementations, external noise assessment 220 may include detecting sensor indicators, e.g., visual signals, natural language speech, etc., that may be interpreted by the playback system as forewarning of an interrupting noise about to occur. Details of the identification of interrupting noises is described below with regards to FIGS. 3-4.

In some implementations, a speech AI model 224 may be employed to predict that microphone signals of external noise is indicative of an interrupting noise. The speech AI model 224 may be previously trained on natural language that is typical of an urgent event requiring attention, language that is specifically directed to the listener. In this manner the detection of interfering noise is not restricted to identifying key words. Instead natural language may be assessed on the fly for attention features.

Training of the speech AI model 224 is described in detail with regards to FIG. 5 below. The AI model may receive as input the microphone signals that had been detected and output identification of the interrupting noise. In some implementations, the AI model further provides labels that indicate types of interrupting noise, such as urgent event, listener directed speech, various pause periods, such as long, medium, or short pause periods, each associated with a predefined length of pause time, etc.

In some implementations, the AI model may be inputted with characteristics of the listener to determine speech directed to a particular listener. For example, variations of names of the listener (including nicknames, formal names, etc.), acquaintances of the listener, familiar environments frequented by the listener and noises typical of the familiar environments, etc. Listener characteristics may be used by the AI model as factors to further predict interrupting noises specific to the listener. Other listener characteristics that may be considered such as demographics including age, hearing ability, hearing related challenges, occupation, education, groups to which the listener associates, listener habits or interests, etc. Listener characteristics may be collected and inputted with permission of the listener.

In some implementations, the playback system may skip back according to a predesignated time (e.g., 1-5 seconds) prior to the interruption. In some circumstances, a predesignated (e.g., determined prior to the listening session) skip back time may be employed, such as when a short portion of the audio content is missed, such as 1-5 seconds. In these cases, the listener may not have significant problems understanding the replayed content.

A skip back assessment module 222 of the audio player 204 may be included to determine skip back point in the audio content. A playback controller 226 controls the output of the audio content, such as according to the skip back points. In some implementations, the playback controller instructs the personal listening device 206 to play, pause, and replay audio via input/output 228.

An input/output 228 to receiving and transmission, such as to/from content provider 210 and personal listening device 206 through network 208. The input/output 228 may also receive user input directly into the audio player.

The personal listening device 206 (also referred to as personal output device) may include an audio receiver 240. The audio content from the audio player 204 may be received by receiver 240 from audio player 204 or directly from content provider 210, and outputted to the listener via audio output 242.

A microphone 244 of the personal listening device 206 monitors the environment for external noise projected from an object 212 that may be in the immediate environment or away from the listener but with sufficient volume to be detected by the microphone. Monitoring for external noise may occur at various times, such as continuously when the personal listening device outputs audio content, when particular audio content is outputted, such as spoken word content, at regularly scheduled intervals, upon request of the listener, upon a triggering event, such as visual indicator of interrupting noise as sensed by sensor 246, etc.

In some implementations, a sensor 246 may capture various sensor data from the environment of the listener that may be interpreted as including attention feature(s) that an interrupting noise is occurring or about to occur. In some implementations, the sensor 246 includes one or more cameras coupled to the personal listening device 206. The camera(s) may face particular directions relative to the listener, such as front facing (same direction as the listener), back facing, one or more side facing, or alternating directions.

Other sensors 246 that may detect information indicative of a current or impending interrupting noise may include ambient light sensor, accelerometer, gps, gyroscope, lidar (e.g., to detect distance from a noise source), magnetometer, proximity sensor (e.g., to detect a distance from a noise source). Some sensors may be employed to triangulate to a noise source and determine whether the source is nearby to the listener. In some implementations, one or more sensors of the audio player may also be employed to detect a noise interruption.

In still some implementations, a user input receiver 248 may be received commands or other input from the listener. For example, a listener may input a manual override playback to cancel the playback mode and continue outputting the content from the point of interruption. User input may be in the form of voice commands, such as "stop skip", natural language commands, or gestures, such as tapping the device. The detection playback system may be equipped with natural language assessment software to interpret a user voice commands using natural language. In this manner, the playback system is not restricted to keyword commands.

Content provider 210 provides audio content that may be in various formats, such as digital prerecorded content, In some implementations, the content provider 210 may provide live audio content, such as a live showing or digital broadcast of a live event. Various audio content may be outputted by the playback system, such as spoken word audio, music, nature sounds, etc. Spoken word content may include various types such as poetry, audio drama, audiobooks, storytelling, non-musical dramas, sermons, narrations with or without music collaboration or accompaniment (where spoken word is the main focus of the content), and instructional recordings, podcasts, interviews, conversational, panel discussions, non-fictional news, stream of consciousness, repurposed content, etc.

Communication may employ any suitable electronic communication for travel across the communication path of network 208. One or more networks 208 may be used for one or two way communication and optionally one or more additional computing resources. The network 208 may connect devices using physical wires, such as cords, and/or also be wireless, such as WiFi, Bluetooth™, near field communication (NFC), etc. In some examples, the network 208 may include one or more cellular networks and/or the Internet, among other networks. In some examples, a local network such as a Bluetooth™ network is employed for communication between the mobile device and television. The network 208 could take other forms as well such as including one or more WANs (Wide-Area Networks) and/or LANs (Local-Area Networks). Typically, the communication path provided by the network 208 is configured for communication over a short distance, such between devices located on a same listener.

Where a wireless network 208 is employed, the network may operate according to one or more communication protocols, such as Bluetooth™, LTE (Long-Term Evolution), CDMA (Code Division Multiple Access), WiMax (Worldwide Interoperability for Microwave Access), WiFi (Wireless Fidelity), WiFi Direct (Wireless Fidelity Direct), EDGE (Enhanced Data rates for GSM (Global System Mobile) Evolution), 3G (Third Generation), 4G (Fourth Generation), HTTP (Hyper-Text Transfer Protocol), TCP (Transmission Control Protocol), SIP (Session Initiation Protocol), device contact based transfer protocols, and other communication protocols.

In some implementations, the audio content may be live produced content, such as a broadcast, that is provided to the audio player and stored as recorded audio by the audio player or other recording device. In such live audio content, the audio player may produce content data on the fly as the audio content is received to assess the data for a skip back point when interrupting noise is identified. In the case of outputting live audio content, the playback system may provide a skip forward feature to return to a live output of the audio content. In some implementations, the playback system may include a skip forward assessment module to determine a natural point in incoming live audio content to skip ahead to output current live audio. For example, after skip back of a commentator describing a currently happening sporting event, the detection playback system may detect a time out in the action and use this natural break in the action to skip forward and catch the listener up with the live event.

Various other configurations of the detection playback system 202 are possible. In some implementations, the audio player 204 may output audio content and/or notifications directly to the listener via speakers or other output components of the audio player 204 without employing the personal listening device. In such implementations, the components of the personal listening deice 206 may be integrated with the audio player 204. In still some implementations, the personal listening device may integrate one or more components of the audio player 204. For example, headphones may include software modules to assess external noise 220, assess a skip back point 222, and/or control playback 226. In some implementations such smart headphones may avoid the need of a separate audio player 204 altogether.

Figure 3:
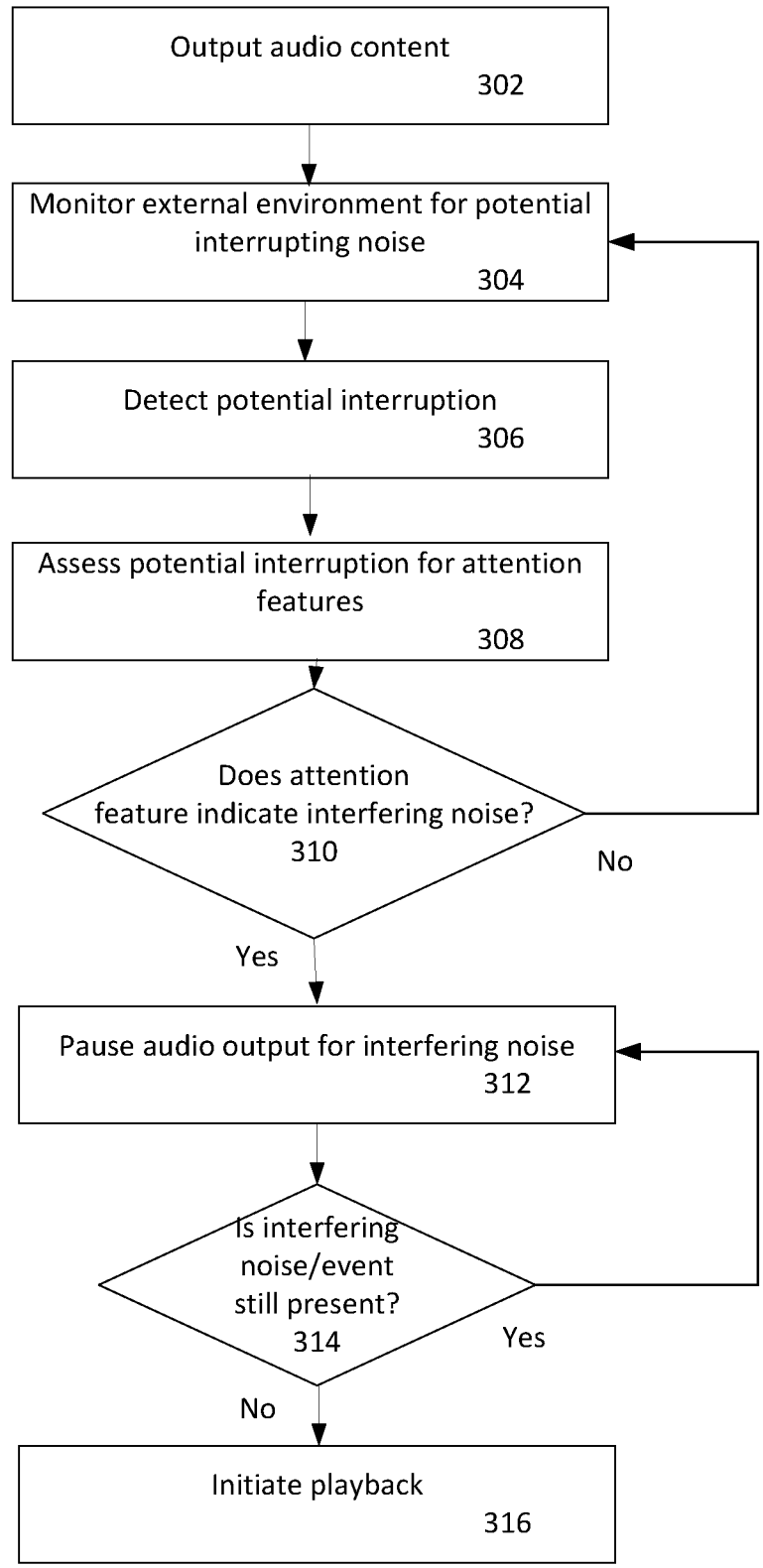
FIG. 3 is a flow diagram of an example method for identifying interfering noise for playback of audio content, in accordance with some implementations.

FIG. 3 shows a flow chart of a process 300 for the playback system to identify and interfering noise, and may be performed, for example, by the audio player 204 of the playback system 202 shown in FIG. 2.

In block 302, audio content is received, for example, via content provider 210 of FIG. 2 and outputted to the listener. In some implementations, an audio player provides the received audio content to a personal listening device to output directly to the listener. In block 304, the environment of the listener is monitored by one or more sensors and/or microphones for potential interrupting noises including visual or other sensors that suggest a potential for such an interrupting noise. In block 306, the microphone signals and/or sensor data are collected that indicate a potential interrupting noise.

In block 308, assessment of the microphone signals and/or sensor data is performed to determine a presence of attention features that require a listener's attention related to the potential interrupting noise.

In some implementations, attention features include various aspects of loudness levels of the external noise. Some of such methods of identifying interrupting noises is described below with regard to FIG. 4.

In some implementations, one or more images are captured as sensor data by one or more cameras coupled to the personal listening device. Image recognition techniques, such as geometric recognition algorithm, photometric algorithms, recognition algorithms that use one or more of principal component analyses, linear discriminant analysis, elastic bunch graph matching, hidden Markov models, and dynamic link matching, may be performed on the one or more images to identify an object and/or gesture(s). It will be appreciated that other known or later developed recognition algorithms, techniques, and/or systems may be employed. Recognition algorithms may be incorporated into the audio player or provided by software that is external to detection playback system and that system accesses.

The image recognition process may include comparing the object in the image with reference images to determine a match. Features of the object may be extracted for analysis, and compared to features of one or more reference images. For example, features may include relative position, size, and/or shape of object features such as facial characteristics, body characteristics, etc. In some implementations, image recognition may include normalizing multiple reference images, and compressing object data from those images into a composite representation having information (e.g., object feature data), and then compare the object in the image to the composite representation for facial recognition.

Through image recognition, the object and/or the gesture is found to indicate that the particular external noise includes the interfering noise that requires attention of the listener.

At times, the gesture may include a person distant from the listener mouthing speech. In these cases, the speech of the person may be recognized by movement of lips, face and/or tongue of the person. The speech may be inputted to a speech AI model, such as an LLM. Output of the speech AI model may predict that the particular external noise includes the interfering noise requiring attention of the listener. Examples of lip reading techniques that may be employed by the detection playback system are described in U.S. Publication No. 2023/0031536, entitled, Correcting Lip Reading Predictions, filed, Jan. 10, 2022, the contents of which are incorporated by reference herein.

In some aspects of certain implementations of the method, identifying the interfering noise further comprises identifying that the particular external noise is speech of a particular person in a location of the listener. Image recognition software may be employed as described above to recognize a particular person. The identification of the person need not necessarily be identified, but that the same particular person repeatedly speaks to the listener or in the location of the listener. If it is determined that the same person speaks a threshold number of times that is more than once, within a predefined period of time, the noise may be identified as interfering with the audio content, triggering playback.

In some implementations, the speaking person may be identified as a person of importance to the listener. For example, the image of the person may be compared to stored images of persons characterized by level of importance to the listener. The speaking threshold number that is required to identify the interfering noise may be scaled based on the level of importance of the speaking person. For example, a person with a high importance may speak fewer times, e.g., twice, to meet the threshold, whereas a person with a low level of importance or unidentified may speak a greater number of times, e.g., 5 to meet the threshold.

In decision block 310, it is determined whether the detected attention features from block 308 satisfy criteria for identification of an interfering noise as described above.

If the attention feature(s) is found to identify the external noise as an interfering noise, the audio content output may be paused in block 312. In some implementations, a notification of the playback mode may be outputted to the listener. If the interfering noise or attention requiring event associated with the interfering noise is still present in decision block 314, the process continues to pause at block 312. If the interfering noise or attention requiring event is found to have concluded in decision block 314, the process initiates playback of the audio content from a skip back point in block 316.

In block 316, audio content is played back from the skip back point in the audio content.

Figure 4:
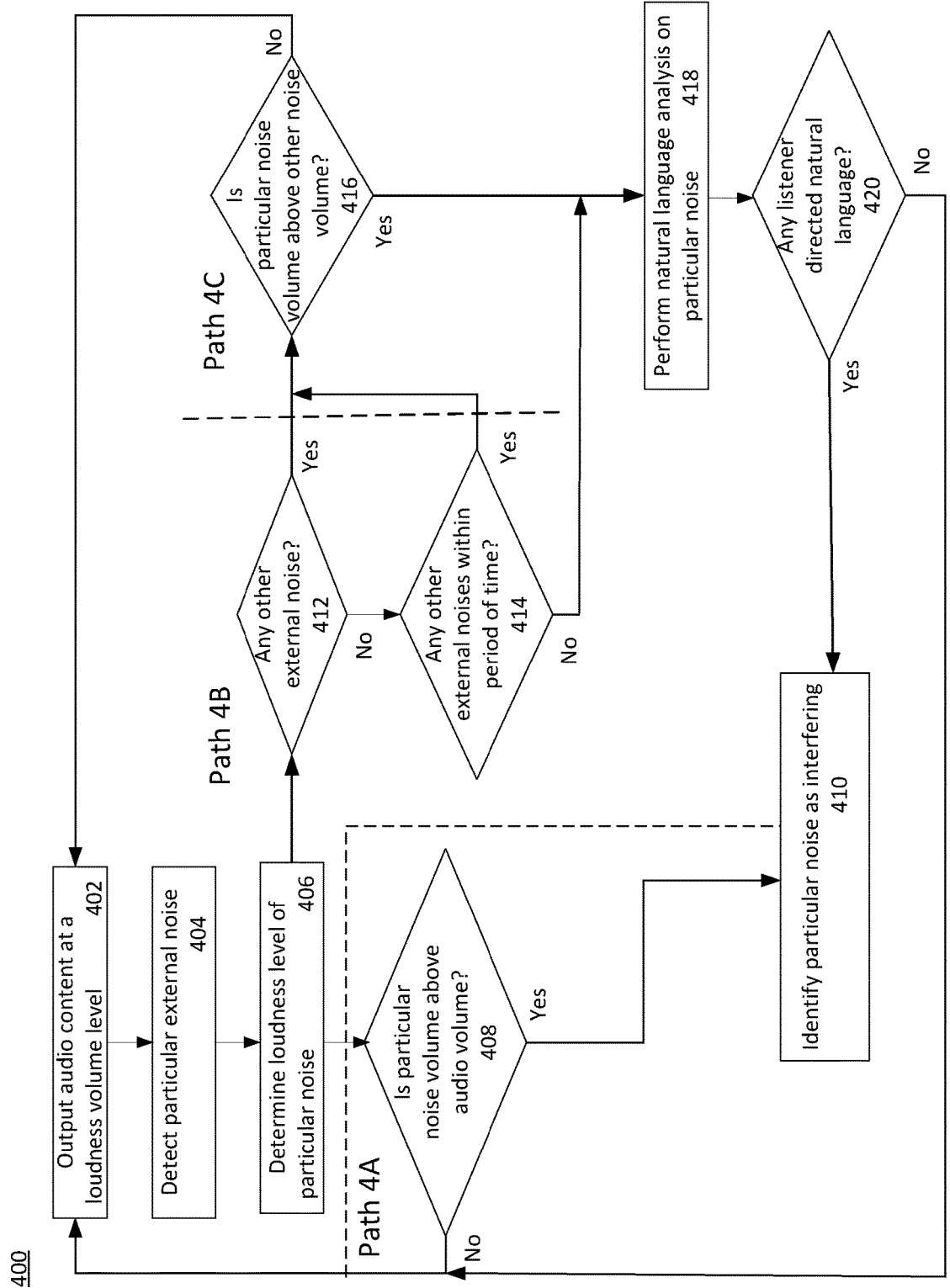
FIG. 4 is a flow diagram of various example method paths 4A-4C for identifying interfering noise by relative noise volume, in accordance with some implementations.

FIG. 4 is a flow chart of methods to identify an interfering noise using loudness levels as attention features. The process 400 may be performed, for example, by the audio player 204 of the playback system 202 shown in FIG. 2. The process 400 shows the method splitting into three alternative paths to identify interfering noise based on attention features associated with loudness level.

In block 402 audio content is outputted at play at a particular loudness volume level. In some implementations, the loudness personal listening device is predetermined and may be adjusted, such as based on any loudness level adjustments made by the user or loudness for a particular audio content type. The loudness level may also be determined by decibel level or sound pressure level of the personal listening device. For example, a decibel meter application may be employed by the detection system, such as software on the audio player, or the personal listening device may be coupled to a decibel meter. In some implementations, the microphone of the personal listening device may be calibrated with the decibel meter and the sensitivity and/or impedance of the personal listening device used in the measurement.

In block 404, a particular external noise is detected in the environment of the listener. The process 400 may continue down Paths 4A, 4B, and/or 4C to assess the particular external noise and determine whether it is identifiable as an interfering noise.

In Path 4A, at decision block 408 the process 400 determines whether the particular noise loudness level is above a loudness level of the outputted audio content. If the particular noise fails to be louder than the audio content by a threshold volume amount, the particular noise is not currently considered an interfering noise and the process returns to block 402 to continue outputting the audio content without interruption. If, on the other hand, the loudness level of the particular noise is above the audio content by an audio content threshold volume amount, the particular noise is identified as an interfering noise in block 410 and triggers playback of audio content.

In Path 4A, at decision block 412 the process 400 searches for indications of additional external noises in addition to the particular noise in the listener environment. If no other external noises are detected, the process continues to decision block 414 to determine if any other external noises is detected over a defined quiet period of time. If no such external noises are detected for the quiet period such that the particular noise is the only detectable noise, then the process continues to block 418 described below. If there are other external noises within the period of time, the process 400 moves down Path 4C to decision block 416.

Furthermore, if in decision block 412, it is found that there are additional detected external noises, the process moves down Path 4C to decision block 416. In decision block 416, it is determined whether the particular noise has a loudness volume level above (greater than) the loudness level of each individual other external noises detected to meet another noise threshold amount. If it is found that the particular noise is fails to be louder by the other noise threshold amount, the particular noise is not identified as an interfering noise and the process returns to block 402 to output audio content without interruption. Otherwise if the particular noise loudness level is above the other noise level(s) by the other noise threshold amount, the process continues to block 418.

At block 418, further assessment using natural language analysis may be performed on the particular noise. In decision block 420, the further assessment includes a determination of whether any listener directed natural language is detected in the particular noise. The received external noise signals from the microphone may be recorded for analysis purposes. For example, the particular noise may include speech that is predicted by a speech AI model to be directed to the listener. The AI model may be a large language model (LLM) such as GTP3 or other such AI model capable of comprehensive natural language analysis. If the particular noise is found to include listener directed language, the particular noise is identified as an interfering noise in block 410 to trigger the playback mode. If there is no listener directed language in the particular noise, the process may return back to block 402 to continue playing the audio content without interruption.

In some implementations where the external noise is a person speaking, it may be determined that the person speaks in the presence of the listener a certain threshold number of times greater than one (such as a number between 3-10, or more specifically 5) within a predefined period of time, such as a 1-5 minute period. Where this repetitive speech threshold is met, the noise may be identified as requiring the listener's attention and thus is interfering.

The playback system continues to monitor the external noise to detect when the external noise ceases for a predefined quiet period of time. For example, if an external noise is intermittent for and repeats after a short predefined quiet period, such as 1-2 seconds, the external noise may be considered to be still present. While the external noise is considered present, the audio content may be paused.

Figure 5:
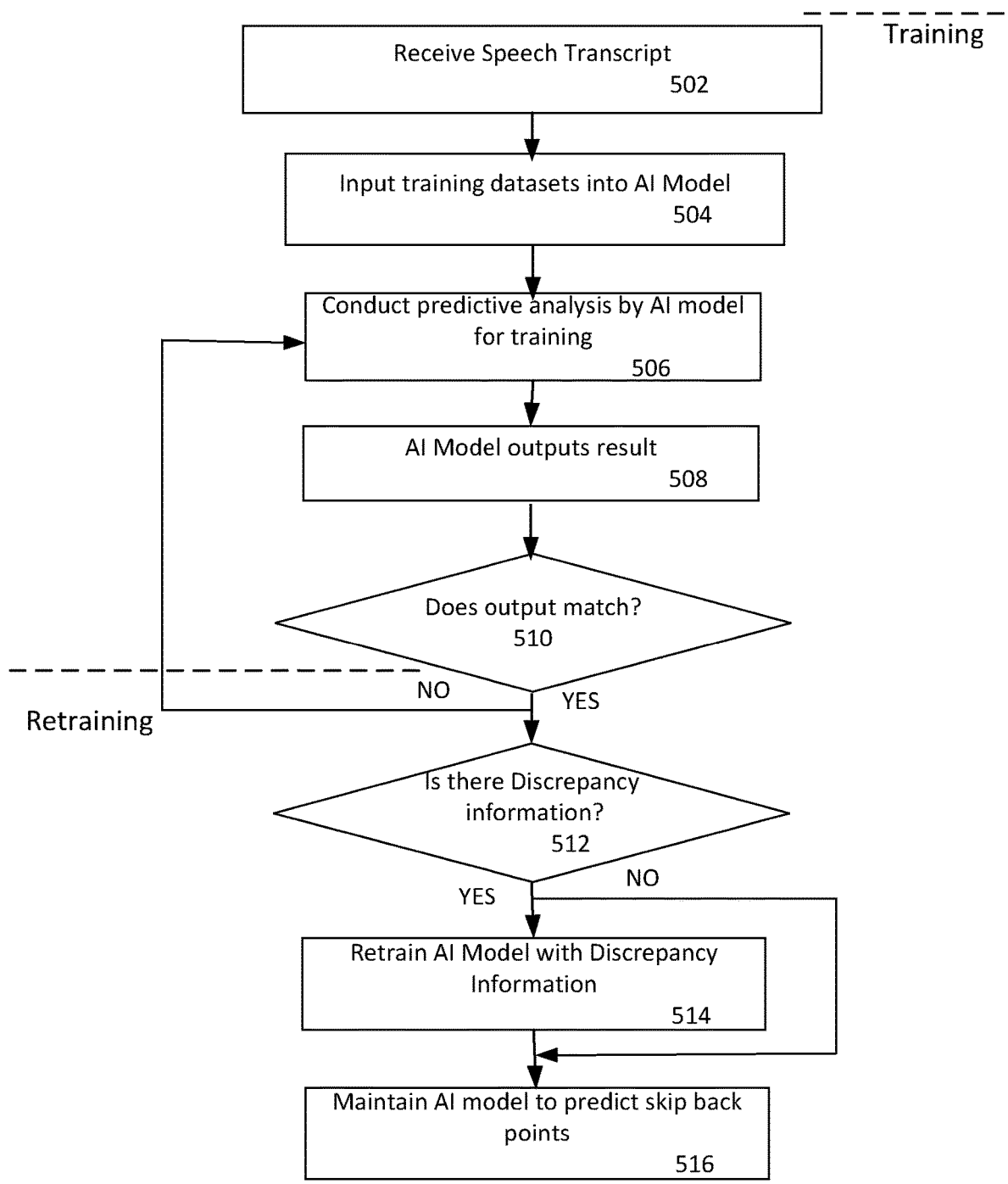
FIG. 5 is a flow diagram of an example method for training a speech artificial intelligence (AI) model for use in predicting speech indicative of interfering noise, in accordance with some implementations.

FIG. 5 is a flow chart of a process 500 for training a speech AI model for use in identifying interfering noises in the environment of listeners. In some implementations, the techniques to train the AI model may employ supervised classification algorithms, such as logistic regression algorithms. In some implementations, unsupervised or semi-supervised techniques may be employed.

In block 502, transcription of speech that may be present in an environment of a listener is received or otherwise accessed for assessment/training purposes. In block 504, training datasets including speech that requires attention of a typical listener is inputted into the AI model. The training datasets may also include labels of types of speech such as urgent event speech, as well as associated attention time required for the types of speech. In some implementations, the training dataset may also include listener characteristics, such as demographics, hearing ability, etc.

In block 506, the AI model conducts predictive analysis using the training datasets. The training of the AI model may include determining patterns in types of speech, listener characteristics, etc., that leads to positive predictive results. Based on the analysis, the AI model outputs a result of the analysis, in block 508. The output result includes identification of interfering noise. The output result may also include additional parameters such as labels as urgent event speech and listener time required. Such additional parameters may be employed by the detection system to determine how long to pause the audio content before playback.

In decision block 510, the output result is compared with the training dataset inputted into the AI model and predetermined expected output result, to determine whether the output result matches. It is determined whether a threshold of success is achieved by the output result. The threshold of success may specify that some value equal to or less than 100% accuracy (such as 80%-90% success rate) is acceptable output results to be used. In some implementations, the output result may be used to dynamically change and enhance stored interfering noise samples.

If it is decided in decision block 510 that the output results match the training datasets to meet the threshold of success, the process continues. If there is a finding that the output results fail to match according to the threshold of success, the AI model is retrained by returning to block 506 and conducting predictive analysis again until the output result matches the training dataset. If a match is not achieved after a threshold number of tries, the analysis algorithm and/or training dataset may be assessed to find a solution to the failures.

In decision block 512, it is determined whether there is discrepancy information from prior AI model output results, in which the output of particular prompts was found to fail a threshold level of success in identifying interfering noises. Discrepancy information may include feedback from an external support resource, quality control studies, user survey data, accident reports, etc. The discrepancy information may be used for retraining in block 514. After discrepancy information retraining is complete, the process proceeds to decision block 516 described below.

If no discrepancy information is received, the process skips the discrepancy information retraining and continues to decision block 516 to maintain the AI model for future use in outputting skip back points for the audio content. For example, the AI model may be trained at a computer processing system independent from the audio player. The audio player may receive the AI model upon receiving the audio content to be outputted to the listener.

Some or all of the training/retraining process 500, or any other processes described herein, or variations and/or combinations of those processes, may be performed under the control of one or more computer systems configured with executable instructions and/or other data, and may be implemented as executable instructions executing collectively on one or more processors. In some implementations, training/retraining process 500 may include additional steps.

The methods of FIGS. 3, 4 and 5 described herein can be performed via software, hardware, and combinations thereof. For example, the process may be carried out in software, such as one or more steps of the process carried out by the detection playback system. Although the description has been described with respect to particular implementations thereof, these particular implementations are merely illustrative, and not restrictive.

Figure 6:
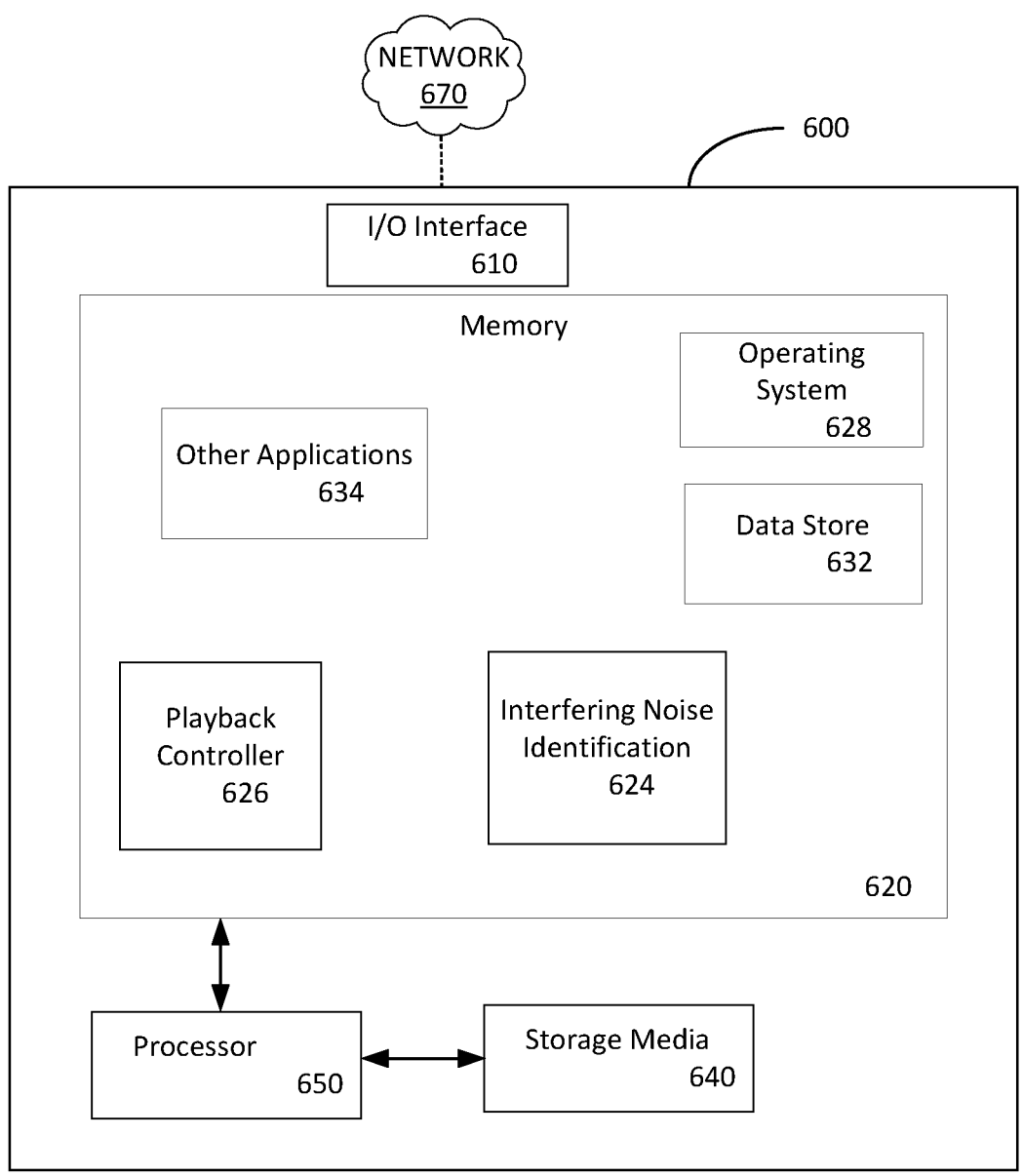
FIG. 6 is a block diagram of components of the detection playback system usable to implement in the processes of FIGS. 3-4, in accordance with some implementations.

FIG. 6 is a block diagram illustrating an example computer device (also referred to as an apparatus) upon which aspects of the playback system described herein, may be implemented. The computer device 600 represent an audio player, personal listening device, other playback system components, or combinations thereof. Computer device 600 is merely illustrative and not intended to limit the scope of the claims. One of ordinary skill in the art would recognize other variations, modifications, and alternatives.

In one exemplary implementation, computer device 600 includes an I/O interface 610 (which may represent a combination of a variety of communication interfaces) that may include a network interface that receives information and data, such as audio content from a content provider (e.g., 210 in FIG. 2), input from a user, such as commands to pause, playback, skip forward, stop audio commands from the listener, noise related data, such as detection data from a microphone and/or sensor of the personal listening device (e.g., 206 in FIG. 2), and other information/data relevant to the playback system processes. A network interface typically includes a network interface card, an Ethernet card, a modem (telephone, satellite, cable, ISDN), (asynchronous) digital subscriber line (DSL) unit, and the like. Further, a network interface may be physically integrated on a motherboard, may be a software program, such as soft DSL, or the like.

Computer device 600 may also include software that enables communications of I/O interface 610 over a network 670 such as HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 670 may include a local area network, a wide area network, a wireless network, an Intranet, the Internet, a private network, a public network, a switched network, or any other suitable communication network, such as for example Cloud networks. Network 670 may include many interconnected computer systems and any suitable communication links such as hardwire links, optical links, satellite or other wireless communications links such as BLUETOOTH, WIFI, wave propagation links, or any other suitable mechanisms for communication of information. For example, network 670 may communicate to one or more mobile wireless devices, such as the audio player paired with the personal listening devices (e.g., headphone, earbud, hearing aid, etc.), mobile phones, tablets, and the like, via a wireless transceiver.

Computer device 600 typically includes familiar computer components such as a processor 650, and memory storage devices, such as a memory 620. A bus may interconnect computer components. While a computer is shown, it will be readily apparent to one of ordinary skill in the art that many other hardware and software configurations are suitable for use with the present invention Memory 620 may include solid state memory in the form of NAND flash memory and storage media 640. The computer device may include a microSD card for storage and/or may also interface with cloud storage server(s). In some implementations, computer device 600 is a smart phone or similar portable computing device, having solid state memory. In some implementations, the computing device may be a portable computer having memory 620 as random access memory (RAM).

Memory 620 and storage media 640 are examples of tangible non-transitory computer readable media for storage of data, audio files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 632 may be employed to store various on-board data.

Computer device 600 includes one or more computer programs, such as software for skip back point assessment 624 (e.g., 222 om FIG. 2) and playback controller 626 (e.g., 226 in FIG. 2) and various other applications 634 to perform operations described herein. Such computer programs, when executed by one or more processors, are operable to perform various tasks of methods including playback of audio content, as described above. The computer programs may also be referred to as programs, software, software applications or code, may also contain instructions that, when executed, perform one or more methods, such as those described herein. The computer program may be tangibly embodied in an information carrier such as computer or machine readable medium, for example, the memory 620, storage device or memory on processor 650. A machine readable medium is any computer program product, apparatus or device used to provide machine instructions or data to a programmable processor.

Computer device 600 further includes an operating system 628 to control and manage the hardware and software of the computer device 600. Any operating system 628, e.g., mobile OS, that is supports the detection playback methods may be employed, e.g., IOS, Android, Windows, MacOS, Chrome, Linux, etc.

Although the description of the playback system has been described with respect to particular embodiments thereof, these particular embodiments are merely illustrative, and not restrictive.

Any suitable programming language can be used to implement the routines of particular embodiments including IOS, Objective C, Swift, Java, Cotlin, C, C++, C#, JavaScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for noise identification to trigger playback of audio content, the method comprising:
   providing the audio content to a personal listening device for output to a listener during a listening session;
   receiving microphone signals and/or sensor data of at least one aspect of an environment of the listener to detect one or more external noises;
   determining respective loudness levels of the one or more external noises according to the microphone signals and/or the sensor data;
   identifying that a particular external noise of the one or more external noises includes an interfering noise disrupting an interfered portion of the audio content being outputted, based, at least in part, on determining that the loudness level of the particular external noise:
      meets a content threshold volume level above a loudness level of the provided audio content, and/or
      meets a comparative threshold volume above respective loudness levels of multiple other external noises;
   determining a skip back point in the provided audio content; and
   providing a playback portion of the audio content for output by the personal listening device during the listening session from the skip back point, wherein the playback portion includes the interfered portion of the audio content.

2. The method of claim 1, wherein identifying the particular external noise further comprises:
   inputting the particular external noise to a large language model to perform natural language analysis and output a prediction that the particular external noise includes a listener directed attention feature or an urgent event feature that requires the attention of the listener.

3. The method of claim 1, wherein the sensor data includes one or more images of one or more cameras coupled to the personal listening device, wherein identifying the interfering noise further comprises:
   performing image recognition on the one or more images to identify an object and/or a gesture; and
   determining that the object and/or the gesture indicates that the particular external noise includes the interfering noise requiring attention of the listener.

4. The method of claim 3, wherein the gesture includes a person distant from the listener mouthing speech, and wherein identifying the interfering noise further comprises:
   predicting the speech of the person by recognizing movement of lips, face and/or tongue of the person; and
   determining, by a speech artificial intelligence (AI) model that the predicted speech indicates that the particular external noise includes the interfering noise requiring attention of the listener.

5. The method of claim 3, wherein the personal listening device is selected from a group of a headphone, an earbud, and a hearing aid.

6. The method of claim 1, wherein identifying the interfering noise further comprises:
   identifying that the particular external noise is speech of a particular person in a location of the listener; and
   detecting the particular person speaks a threshold number of times greater than one within a predefined period of time.

7. The method of claim 1, further comprising:
   providing to the personal listening device for output to the listener, a voice notification of a playback mode prior to outputting the playback portion.

8. The method of claim 1, wherein the audio content is a live audio event and the method further comprising:
   identifying a skip forward point in the audio content by determining a break in the live event; and
   after providing the playback portion of the audio content, providing the audio content from the skip forward point.

9. An apparatus of a detection playback system for noise identification to trigger playback of audio content, the apparatus comprising:
   one or more processors; and
   logic encoded in one or more non-transitory media for execution by the one or more processors and when executed operable to perform operations comprising:
      providing the audio content to a personal listening device for output to a listener during a listening session;
      receiving microphone signals and/or sensor data of at least one aspect of an environment of the listener to detect one or more external noises;
      determining respective loudness levels of the one or more external noises according to the microphone signals and/or the sensor data;
      identifying that a particular external noise of the one or more external noises includes an interfering noise disrupting an interfered portion of the audio content being outputted, based, at least in part, on determining that the loudness level of the particular external noise:
         meets a content threshold volume level above a loudness level of the provided audio content, and/or
         meets a comparative threshold volume above respective loudness levels of multiple other external noises;
      determining a skip back point in the provided audio content; and
      providing a playback portion of the audio content for output by the personal listening device during the listening session from the skip back point, wherein the playback portion includes the interfered portion of the audio content.

10. The apparatus of claim 9, wherein identifying the particular external noise further comprises:
    inputting the particular external noise to a large language model to perform natural language analysis and output a prediction that the particular external noise includes a second listener directed attention feature or an urgent event feature that requires the attention of the listener.

11. The apparatus of claim 9, wherein the sensor data includes one or more images of one or more cameras coupled to the personal listening device, wherein identifying the interfering noise further comprises:
    performing image recognition on the one or more images to identify an object and/or a gesture; and
    determining that the object and/or the gesture indicates that the particular external noise includes the interfering noise requiring attention of the listener.

12. The apparatus of claim 11, wherein the gesture includes a person distant from the listener mouthing speech, and wherein identifying the interfering noise further comprises:
    predicting the speech of the person by recognizing movement of lips, face and/or tongue of the person; and
    determining, by a speech artificial intelligence (AI) model that the predicted speech indicates that the particular external noise includes the interfering noise requiring attention of the listener.

13. The apparatus of claim 9, wherein the audio content is a live audio event and the method further comprising:
- identifying a skip forward point in the audio content by determining a break in the live event; and
- after providing the playback portion of the audio content, providing the audio content from the skip forward point.

14. A non-transitory computer-readable storage medium carrying program instructions thereon for noise identification to trigger playback of audio content, the instructions when executed by one or more processors cause the one or more processors to perform operations comprising:
- providing the audio content to a personal listening device for output to a listener during a listening session;
- receiving microphone signals and/or sensor data of at least one aspect of an environment of the listener to detect external noises;
- determining that the microphone signals and/or the sensor data include at least one attention feature including a void of noise in the environment for a predefined silent period of time immediately prior to detecting a particular external noise in the environment;
- identifying that the particular external noise includes an interfering noise disrupting an interfered portion of the audio content being outputted, based, at least in part, on determining the at least one attention feature;
- determining a skip back point in the provided audio content; and
- providing a playback portion of the audio content for output by the personal listening device during the listening session from the skip back point, wherein the playback portion includes the interfered portion of the audio content.

15. The storage medium of claim 14, wherein identifying the particular external noise further comprises:
- inputting the particular external noise to a large language model to perform natural language analysis and output a prediction that the particular external noise includes a listener directed attention feature or an urgent event feature that requires the attention of the listener, of the at least one attention feature.

16. The storage medium of claim 14, wherein the sensor data includes one or more images of one or more cameras coupled to the personal listening device, wherein identifying the interfering noise further comprises:
- performing image recognition on the one or more images to identify an object and/or a gesture; and
- determining that the object and/or the gesture indicates that the particular external noise includes the interfering noise requiring attention of the listener.

17. The storage medium of claim 16, wherein the gesture includes a person distant from the listener mouthing speech, and wherein identifying the interfering noise further comprises:
- predicting the speech of the person by recognizing movement of lips, face and/or tongue of the person; and
- determining, by a speech artificial intelligence (AI) model that the predicted speech indicates that the particular external noise includes the interfering noise requiring attention of the listener.

18. The storage medium of claim 14, wherein identifying the interfering noise further comprises:
- identifying that the particular external noise is speech of a particular person in a location of the listener; and
- detecting the particular person speaks a threshold number of times within a predefined period of time.

19. The storage medium of claim 14, wherein the audio content is a live audio event and the method further comprising:
- identifying a skip forward point in the audio content by determining a break in the live audio event; and
- after providing the playback portion of the audio content, providing the andio content from the skip forward point.

* * * * *